United States Patent [19]

Margolin

[11] Patent Number: 5,974,423
[45] Date of Patent: Oct. 26, 1999

[54] METHOD FOR CONVERTING A DIGITAL ELEVATION DATABASE TO A POLYGON DATABASE

[76] Inventor: Jed Margolin, 3570 Pleasant Echo Dr., San Jose, Calif. 95148-1916

[21] Appl. No.: 09/036,680

[22] Filed: Mar. 9, 1998

[51] Int. Cl.$^6$ ..................................................... G06F 17/30
[52] U.S. Cl. .................................. 707/104; 707/1; 707/6; 345/142; 345/420; 345/422; 345/423; 345/502; 345/503; 345/522; 345/419
[58] Field of Search ................................. 707/1, 6, 104; 701/120, 207, 213; 340/945, 961, 964; 702/150; 169/53; 455/504, 671; 345/419, 421, 142, 420, 422, 423, 502, 503, 522; 434/12, 38; 342/195; 382/180

[56] References Cited

U.S. PATENT DOCUMENTS

| | | | |
|---|---|---|---|
| 4,660,157 | 4/1987 | Beckwith et al. | 345/421 |
| 4,884,971 | 12/1989 | Chan et al. | 434/2 |
| 4,970,682 | 11/1990 | Beckwith et al. | 707/1 |
| 5,140,532 | 8/1992 | Beckwith et al. | 395/101 |
| 5,179,638 | 1/1993 | Dawson et al. | 245/425 |
| 5,272,639 | 12/1993 | McGuffin | 701/207 |
| 5,299,300 | 3/1994 | Femal et al. | 345/428 |
| 5,329,615 | 7/1994 | Peaslee | 345/502 |
| 5,448,694 | 9/1995 | Wada | 345/473 |
| 5,566,073 | 10/1996 | Margolin | 701/120 |
| 5,606,627 | 2/1997 | Kuo | 382/154 |
| 5,751,852 | 5/1998 | Marimont | 382/180 |
| 5,850,223 | 12/1998 | Fujita | 345/420 |

OTHER PUBLICATIONS

Description of USGS Digital Elevation Model Data, Earth Resources Observation Systems, U.S. Geological Survey, EROS Data Center, Sioux Falls, SD 57198 pp. 1–10 (No date).

*Primary Examiner*—Paul R. Lintz
*Assistant Examiner*—Diane D. Mizrahi

[57] ABSTRACT

A Digital Elevation Database is converted to a Polygon Database by creating square cells of varying sizes, starting with a minimum size cell. A center elevation point in the cell is used to form four three-dimensional triangles. The points within the cell are then tested against the flatness criteria. If the cell meets the flatness criteria it is expanded and tested again. This goes on until the cell fails the flatness criteria or a maximum specified cell size is reached. The cell parameters for the last trial cell meeting the flatness criteria or the maximum specified cell size are then entered into the polygon database. The points in the cell are then removed from the elevation database and the process starts over until all the points have been processed. In a second embodiment the procedure starts with a maximum size cell and the cell size is reduced until the cell meets the flatness criteria.

19 Claims, 15 Drawing Sheets

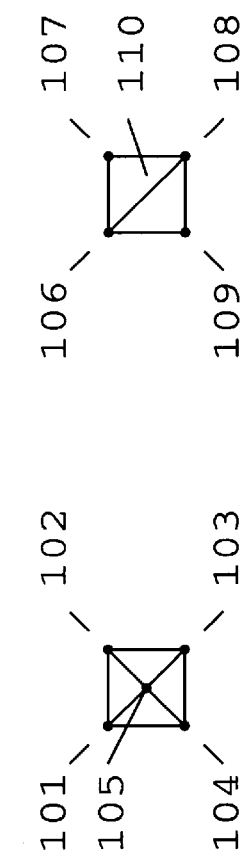

| 13 | 23 | 33 |
|---|---|---|
| 12 | 22 ↑ | 32 |
| 11 | 21 | 31 |

Fig. 10b

| 12 | 22 | 32 |
|---|---|---|
| 11 | 21 ↑ | 31 |
| 10 | 20 | 30 |

Fig. 10a

| 13 | 23 | 33 |
|----|----|----|
| 12 | 22 ↑ | 32 |
| 11 | 21 | 31 |

Fig. 11a

| 23 | 33 | 43 |
|----|----|----|
| 22 | 32 ↑ | 42 |
| 21 | 31 | 41 |

Fig. 11b

Points: Orthographic

Polygon Database

Number of Cells = 1963
Flatness Criteria P=10
Flatness Criteria M=-20

Number of Cells of size 2 = 325
Number of Cells of size 4 = 120
Number of Cells of size 6 = 221
Number of Cells of size 8 = 267
Number of Cells of size 10 = 1030

Polygon Database

Number of Cells = 2026
Flatness Criteria P=10
Flatness Criteria M=-20

Number of Cells of size 2 = 365
Number of Cells of size 4 = 154
Number of Cells of size 6 = 228
Number of Cells of size 8 = 267
Number of Cells of size 10 = 1012

METHOD FOR CONVERTING A DIGITAL ELEVATION DATABASE TO A POLYGON DATABASE

CROSS REFERENCES TO RELATED APPLICATIONS

This patent application relates to the material disclosed in patent application "Digital Map Generator and Display System", Ser. No. 08/944,366 now pending filed Oct. 6, 1997 by the present inventor and to U.S. Pat. No. 5,566,073 PILOT AID USING A SYNTHETIC ENVIRONMENT issued Oct. 15, 1996 to the present inventor.

BACKGROUND OF THE INVENTION

1. Field of Invention

This invention relates to a method for compressing a digital elevation database for a system for displaying three-dimensional terrain data.

2. Discussion of Prior Art

Copending patent application "Digital Map Generator and Display System", Ser. No. 08/566,073 filed Oct. 6, 1997 now U.S. Pat. No. 5,862,186 by the present inventor, describes a digital map system for displaying three-dimensional terrain data using terrain data in the form of polygons. The polygon database is produced from a database of elevation points which are divided into m×n cells which have an elevation point in the center of the cell. The center point forms four polygons with the corners of the cell. The elevation of the center point may be chosen to be the highest elevation point in the m×n cell, the average elevation of the elevation points in the m×n cell, or the elevation of the actual center point.

Other systems using elevation data directly have been developed that present an apparent three-dimensional effect as well as some that present a mathematically correct texture-mapped three-dimensional projected display. Both of these systems require a very large amount of storage for terrain data.

The 1987 patent to Beckwith et al. (U.S. Pat. No. 4,660,157) compresses terrain data using the Discrete Cosine Transform and stores it on a tape. The compressed data is read from the cassette tape in a controlled manner based on the instantaneous geographical location of the aircraft as provided by the aircraft navigational computer system and reconstructs the compressed data by suitable processing and writing the reconstructed data into a scene memory. Further processing of the data provides a 3D perspective on the display. The aircraft's heading is accounted for by controlling the way the data is read out from the scene memory. Different heading angles result in the data being read from a different sequence of addresses. Since addresses exist only at discrete locations, the truncation of address locations causes an unavoidable change in the map shapes as the aircraft changes heading. Beckwith's method displays only discrete points. This is made very apparent in Beckwith's use of a 'column max memory' in order to eliminate hidden points. The present invention mathematically rotates terrain polygons as the aircraft changes attitude. The resolution is determined by the number of bits used to represent the vertices of the polygons, not the number of storage addresses. Further, the present invention displays three-dimensional projected polygons, not discrete points as produced by Beckwith.

The 1989 patent to Chan et al. (U.S. Pat. No. 4,884,971) teaches a method of interpolating elevation values using polynomials. The interpolated values are used in a radar simulator.

The 1990 patent to Beckwith et al. (U.S. Pat. No. 4,970,682) teaches a database consisting of rows and columns of digital elevation points, which is first compressed using the hybrid discrete cosine transform (DCT) compression algorithm, with differential pulse code modulation (DPCM) being used to transmit the DCT coefficient differences between each row of grid points. During operation the compressed data are read from the cassette tape, reconstructed, and stored in a scene memory with a north-up orientation. A read control circuit then controls the read-out of data from the scene memory with a heading-up orientation to provide a real-time display of the terrain over which the aircraft is passing. The display provided by this system is in the form of a moving map rather than a true perspective display of the terrain as it would appear to the pilot through the window of the aircraft. Note also that the display does not reflect the roll or pitch angles of the aircraft, only the aircraft's heading. Because the Beckwith patent accounts for the aircraft's heading by controlling the way the data is read out from the scene memory, different heading angles result in the data being read from a different sequence of addresses. Since addresses exist only at discrete locations, the truncation of address locations causes an unavoidable change in the map shapes as the aircraft changes heading.

The 1993 patent to Dawson et al. (U.S. Pat. No. 5,179,638) shows a a method and apparatus for providing a texture mapped perspective view for digital map systems which includes a geometry engine that receives the elevation posts scanned from the cache memory by the shape address generator. A tiling engine is then used to transform the elevation posts, where each square cell is divided into two three-dimensional triangles.

The 1994 patent to Femal et al. (U.S. Pat. No. 5,299,300) teaches an improvement over the Beckwith '682 patent. Where Beckwith teaches database compression by using the Discrete Cosine Transform, Femal achieves database compression by omitting every other row and every other column of the original database. In both Beckwith and Femal, during operation the compressed data are read from the cassette tape, reconstructed, and stored in a scene memory with a north-up orientation. A read control circuit then controls the read-out of data from the scene memory with a heading-up orientation to provide a real-time display of the terrain over which the aircraft is passing. However, whereas in Beckwith the addresses are truncated, causing an unavoidable change in the map shapes as the aircraft changes heading, Femal uses bilinear interpolation to create a plurality of interpolated addresses to create a smoother appearance as the data are read out.

The 1996 patent issued to the present inventor (U.S. Pat. No. 5,566,073 PILOT AID USING A SYNTHETIC ENVIRONMENT issued Oct. 15, 1996) describes a system that presents the pilot of an aircraft with a computer synthesized three-dimensional view of what is outside the aircraft, unobscured by darkness or weather. The '073' patent teaches a method of converting a digital elevation database to a polygon database by selecting an elevation point and growing polygons until they no longer meet the flatness criteria. See FIG. 12a through FIG. 12e and FIG. 13a through FIG. 13e.

Accordingly, one of the objects and advantages of my invention is to provide a more efficient method of converting a Digital Elevation Database to a Polygon Database while reducing the amount of storage required for the database. The invention can be used in a flight simulator, a video game, or in other systems that use digitized terrain.

Further objects and advantages of my invention will become apparant from a consideration of the drawings and ensuing description.

SUMMARY OF THE INVENTION

A Digital Elevation Database is converted to a Polygon Database by creating square cells of varying sizes.

First a minimum size square cell is formed from a selected center elevation point and four corner elevation points. The center elevation point in the cell is used to form four three-dimensional triangles where each three-dimensional triangle is formed from the center elevation point and two adjacent corner elevation points forming a side of the cell. The points within the four three-dimensional triangles are then tested against the flatness criteria. In order to meet the flatness criteria, no point in the four three-dimensional triangles may be greater than a distance FCP above or a distance FCM below the corresponding point in the Digital Elevation Database.

If the cell meets the flatness criteria it is expanded and tested again. This goes on until the cell fails the flatness criteria or a maximum specified cell size is reached. The cell parameters for the last trial cell meeting the flatness criteria or the maximum specified cell size are then entered into the polygon database and the points making up the cell are removed from the elevation database. Cells are formed until all the points in the elevation database are used.

In a second embodiment the procedure starts with a maximum size cell and the cell size is reduced until the cell meets the flatness criteria.

In either embodiment, cells may be started by selecting the highest elevation point in the elevation database and working downward or by selecting the lowest elevation point in the elevation database and working upward.

DESCRIPTION OF THE DRAWINGS

FIG. 1a shows a square cell with a center point forming four triangles.

FIG. 1b shows a typical cell produced by the Dawson method.

FIG. 1c shows a group of typical cells produced by the Dawson method.

FIG. 1d shows the center point and four corner points for a 9 point cell.

FIG. 1e shows the center point, four corner points, and four side points for a 9 point cell, where the side points represent real elevation points.

FIG. 6 shows the center point, four corner points, and 44 interpolated points for a 49 point cell.

FIG. 10a shows the impending crossover from Geographic Data Block to Geographic Data Block 22.

FIG. 10b shows the result of a crossover from Geographic Data Block to Geographic Data Block 22.

FIG. 11a shows the impending crossover from Geographic Data Block to Geographic Data Block 32.

FIG. 11b shows the result of a crossover from Geographic Data Block to Geographic Data Block 32.

DETAILED SPECIFICATION

The Digital Elevation Model Database

Figure 2A:
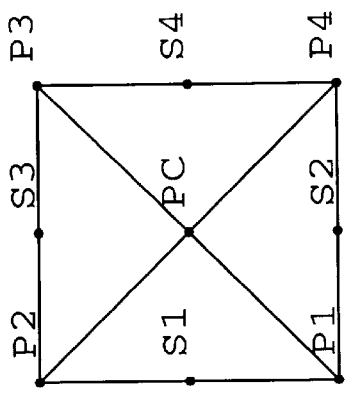
FIG. 2a shows the center point, four corner points, and four side points for a 9 point cell, where the side points represent interpolated elevation points.

The U.S. Geological Survey (USGS) has available a database called the Digital Elevation Model which consists of an array of regularly spaced terrain elevations. It can be purchased on 9 track tape or it can be downloaded from the USGS ftp site on the Internet. The data used as an example to illustrate the present invention is from the SEATTLE-E DEM file downloaded from the USGS ftp site. For the purposes of illustration the elevation values are exaggerated.

Database Conversion

FIG. 1a shows a typical square cell made of corner elevation points 101, 102, 103, and 104. Center elevation point 105 is used to form four three-dimensional triangle s within the cell:

1. the triangle made from points 105, 101, and 102;
2. the triangle made from points 105, 102, and 103;
3. the triangle made from points 105, 103, and 104; and
4. the triangle made from points 105, 104, and 101;

Note how this is different from the method taught by Dawson. In Dawson's method, as shown in FIG. 1b, the cell with corner points 106, 107, 108, and 109 is divided into two triangles by diagonal line 110 connecting corner points 106 and 108.

The two triangles are:

1. the triangle made from points 106, 107, and 108; and
2. the triangle made from points 108, 109, and 106.

FIG. 1c shows a group of typical cells produced by the Dawson method.

The digital elevation database is converted to a polygon database by the following steps.

Figure 2B:
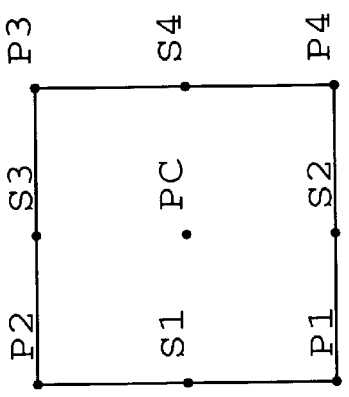
FIG. 2b shows the four edges for a 9 point cell.
Figure 2C:
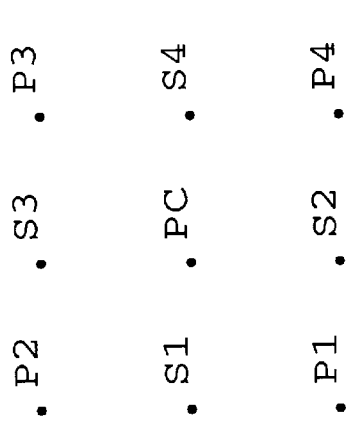
FIG. 2c shows the four edges and four diagonals for a 9 point cell.
Figure 2E:
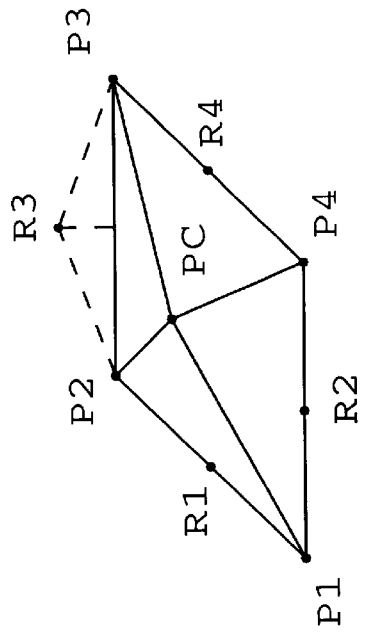
FIG. 2e is a three-dimensional projected representation of a 9 point cell, where one of the real side points is greater than its corresponding interpolated point.
Figure 2D:
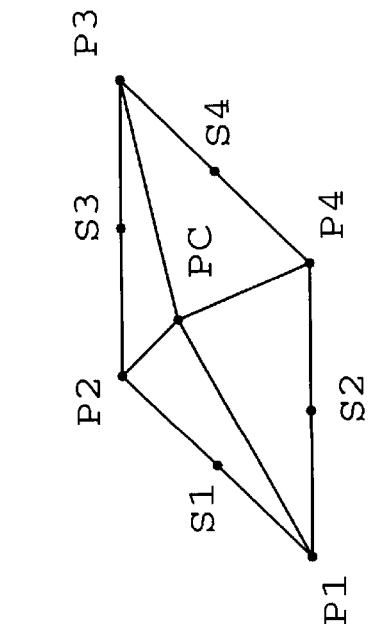
FIG. 2d is a three-dimensional projected representation of a 9 point cell, where the side points are interpolated.

1. Start with a list of rows and columns of elevation points, designated 'points(x,y)'.
2. Make a copy of the list points(x,y), designated 'dpoints (x,y)'. As cells are created, the points in the cells will be removed from dpoints(x,y). The reason for removing the points from the copy of points(x,y) is that some elevation points may be used in more than one cell, thus the original points must always remain available during the creation of the polygon database. Other methods may be used to accomplish this. For example, instead of maintaining a duplicate list of points, a list of flags can be used corresponding to the list of elevation points. Points that have been removed from the duplicate list of points or have had their flags set are deemed to be inactive.
3. Find the highest elevation of the active points in the list dpoints(x,y). The address of this point will be used as the selected center elevation point of the cell, designated '(xc,yc)'. If there are no more active elevation points, then stop.
4. Form a square cell with center elevation point PC=(xc, yc) and with corner elevation points:
    P1=(xc−n,yc−n),
    P2=(xc−n,yc+n),
    P3=(xc+n,yc+n), and
    P4=(xc+n,yc−n).
where n=1.
We will call this a cell with size =2 because it is 2 units wide and 2 units long . This is shown in FIG. 1d.
5. The elevations for the cell are:
    Zc=points(xc,yc);
    Z1=points(xc−1,yc−1);
    Z2=points(xc−1,yc+1);
    Z3=points(xc+1,yc+1); and
    Z4=points(xc+1,yc−1).
6. The cell forms four three-dimensional triangles where each three-dimensional triangle is formed from the center elevation point and two adjacent corner elevation points forming a side of the cell:
    1. PC, P1, P2
    2. PC, P2, P3
    3. PC, P3, P4
    4. PC, P4, P1
This is shown in FIG. 2c. A three-dimensional projected image of a cell is shown in FIG. 2d.
   7. Referring to FIG. 1e, points R1, R2, R3, and R4 in the original elevation database are not part of the cell data. The corresponding points in the synthesized cell are points S1, S2, S3, and S4 as shown in FIG. 2. Points S1, S2, S3, and S4 in the synthesized cell will be synthesized from the cell data and are compared to points R1, R2, R3, and R4 in the original elevation database to determine if they meet the predetermined flatness criteria.
In order to meet the flatness criteria, no point in the synthesized cell may be greater than a distance FCP above or a distance FCM below the corresponding point in the original elevation database.
The general procedure for synthesizing the points in the cell is to use interpolation to:
    a. Use the corner elevation points to derive the edge points.
    b. Use the center elevation point with the corner elevation points to derive the diagonal points.
    c. Since triangles are, by definition, planar, the points making up the four three-dimensional triangles formed from the center elevation point and the corner elevation points are used to derive the interior points in each respective triangle.
The first trial cell is for size=2 as shown in FIG. 2a.
First we derive the edge points. Referring to FIG. 2b, because point S1 is located on the line formed by points P1 and P2 and is halfway between points P1 and P2, the elevation of S1 is simply the average of the elevation at point P1 and the elevation at point P1.

Figures 3A, 3B:
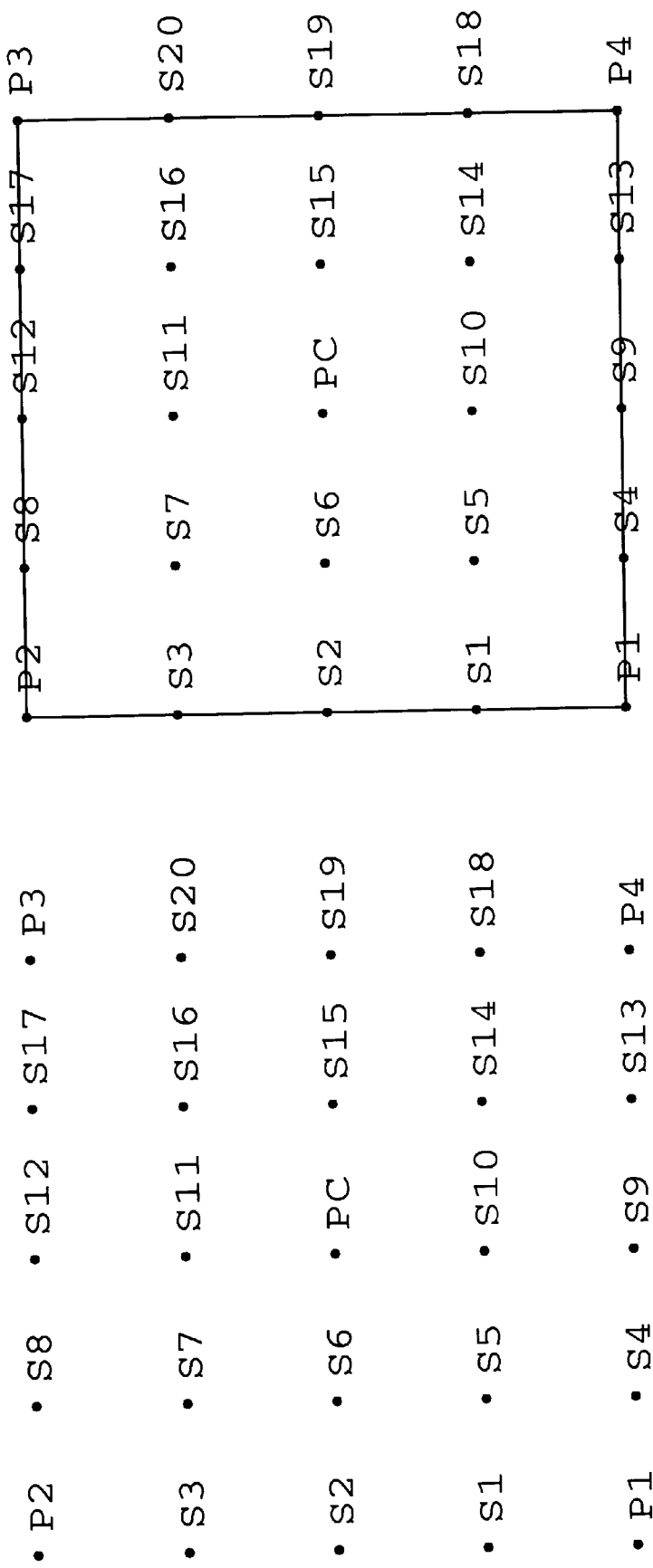
FIG. 3a shows the center point, four corner points, and 20 interpolated points for a 25 point cell.
FIG. 3b shows the four edges of a 25 point cell.
Figure 4:
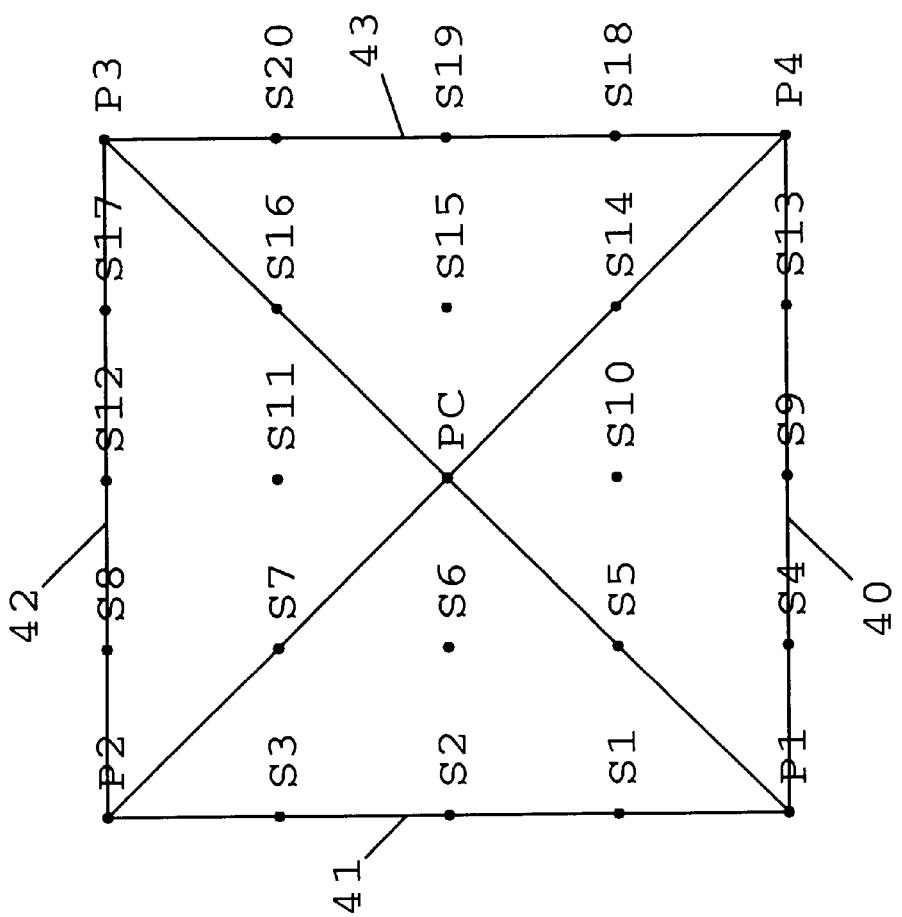
FIG. 4 shows the four edges and four diagonals of a 25 point cell.
Figure 5:
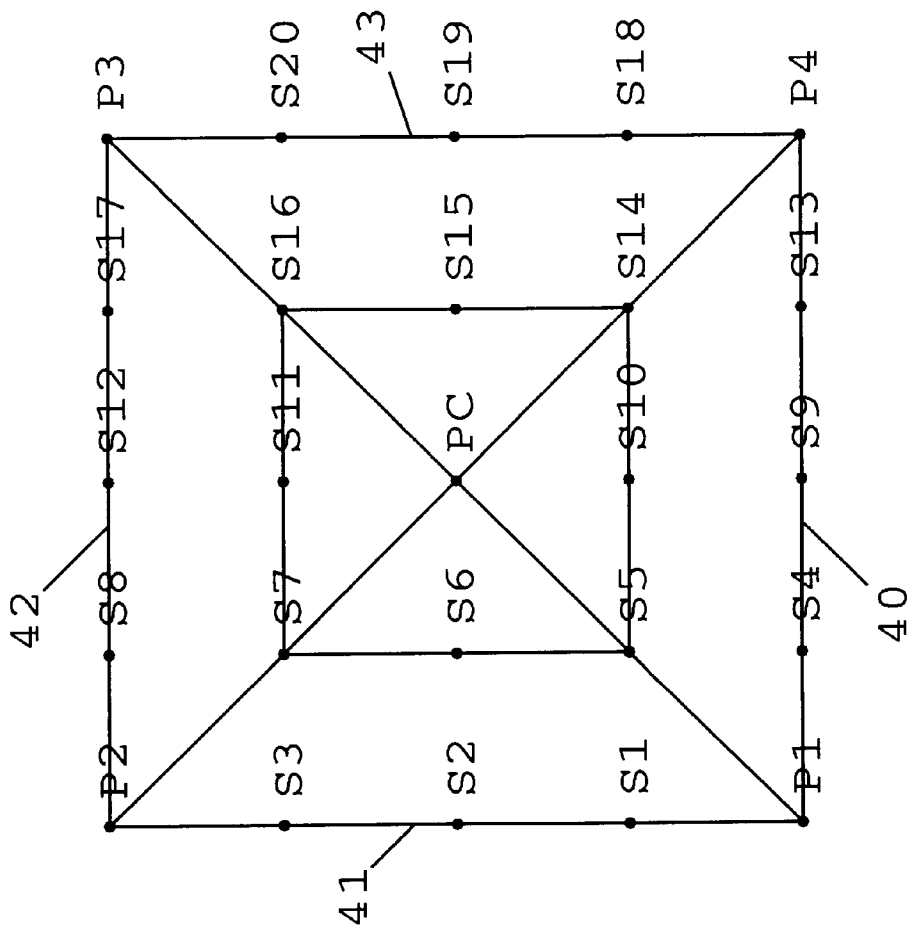
FIG. 5 shows the four edges, four diagonals, and four interior lines used to interpolate the values of the four interior points of a 25 point cell.
Figure 6:
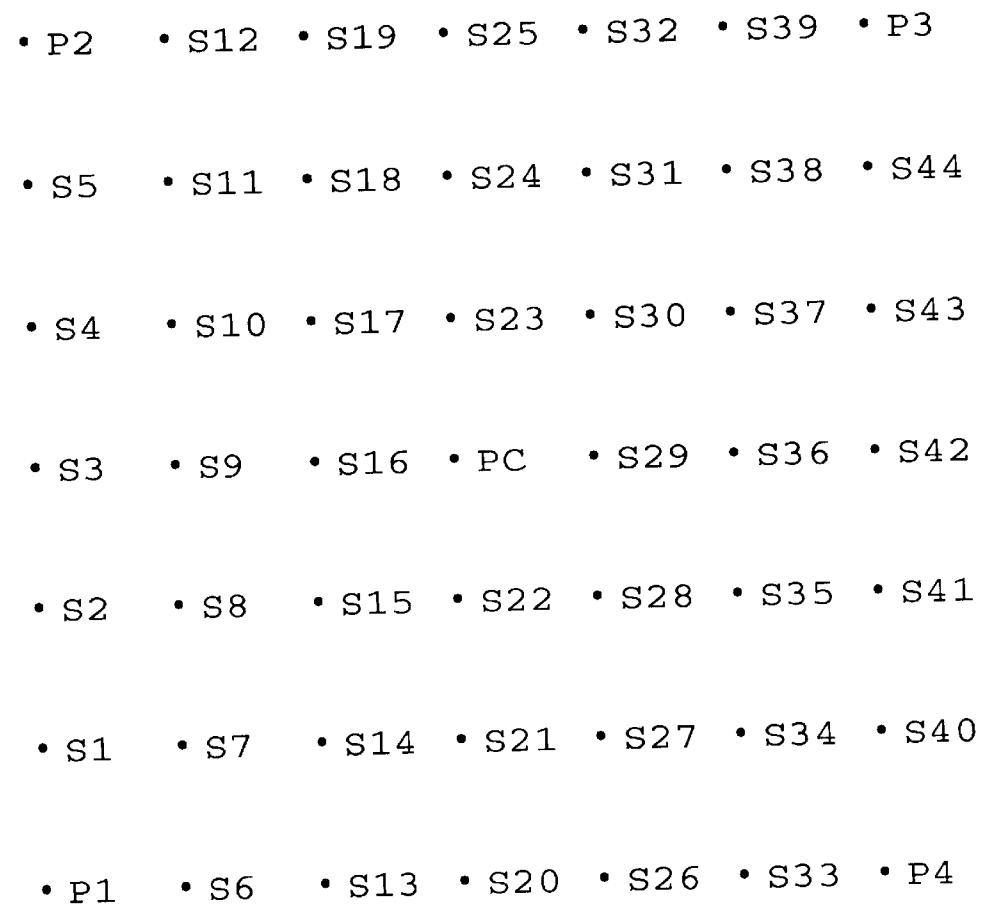
Figure 7:
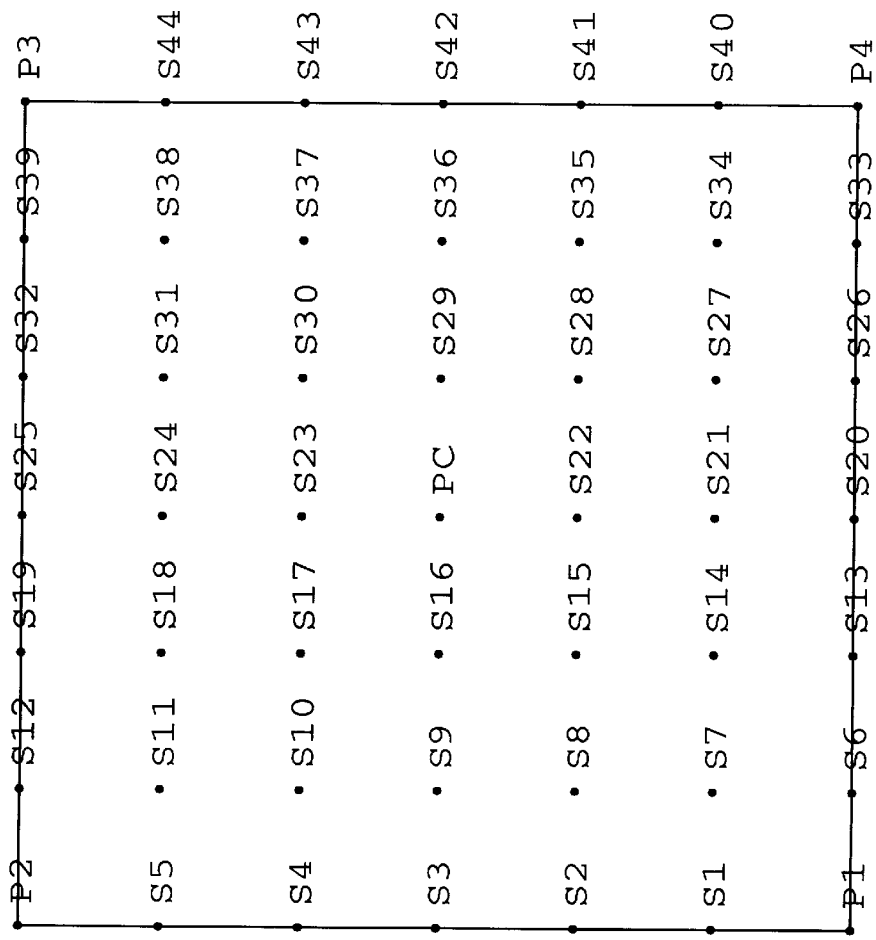
FIG. 7 shows the four edges of a 49 point cell.
Figure 8:
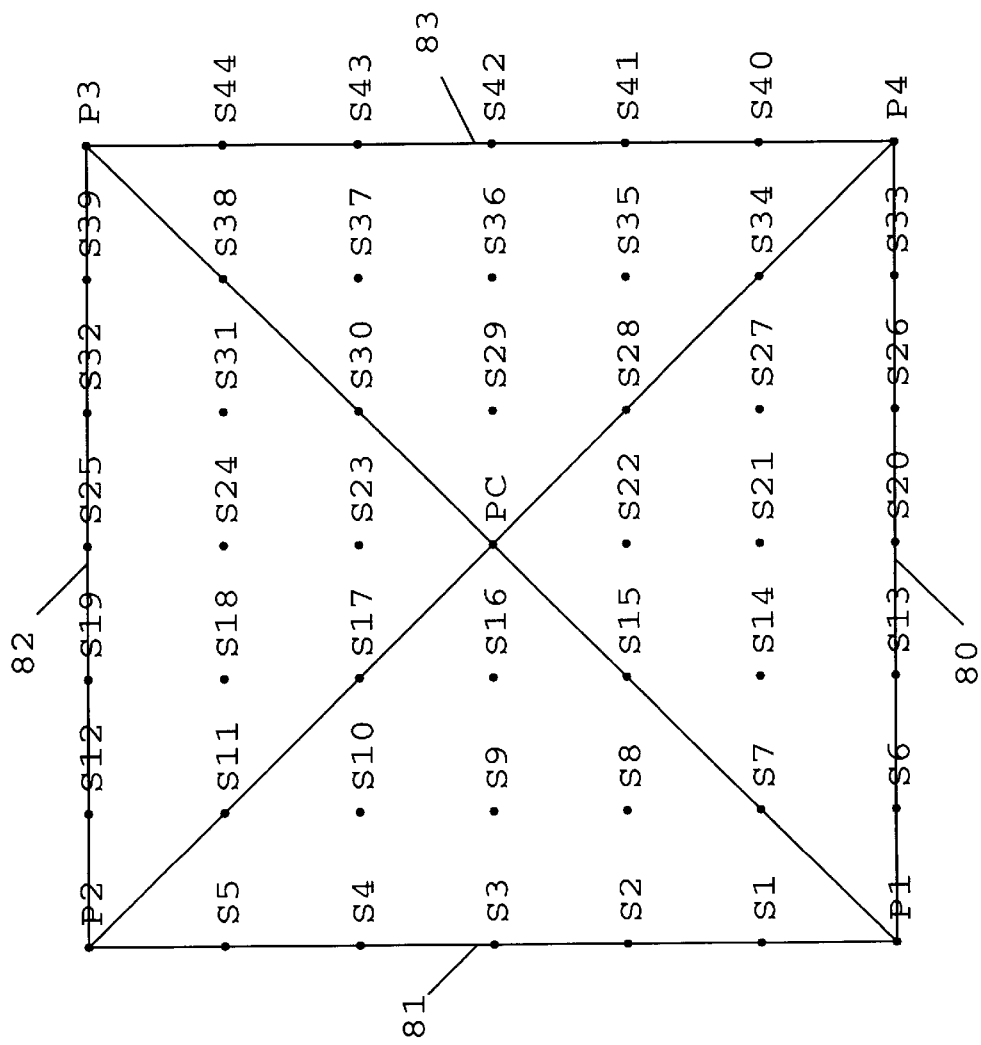
FIG. 8 shows the four edges and four diagonals of a 49 point cell.
Figure 9:
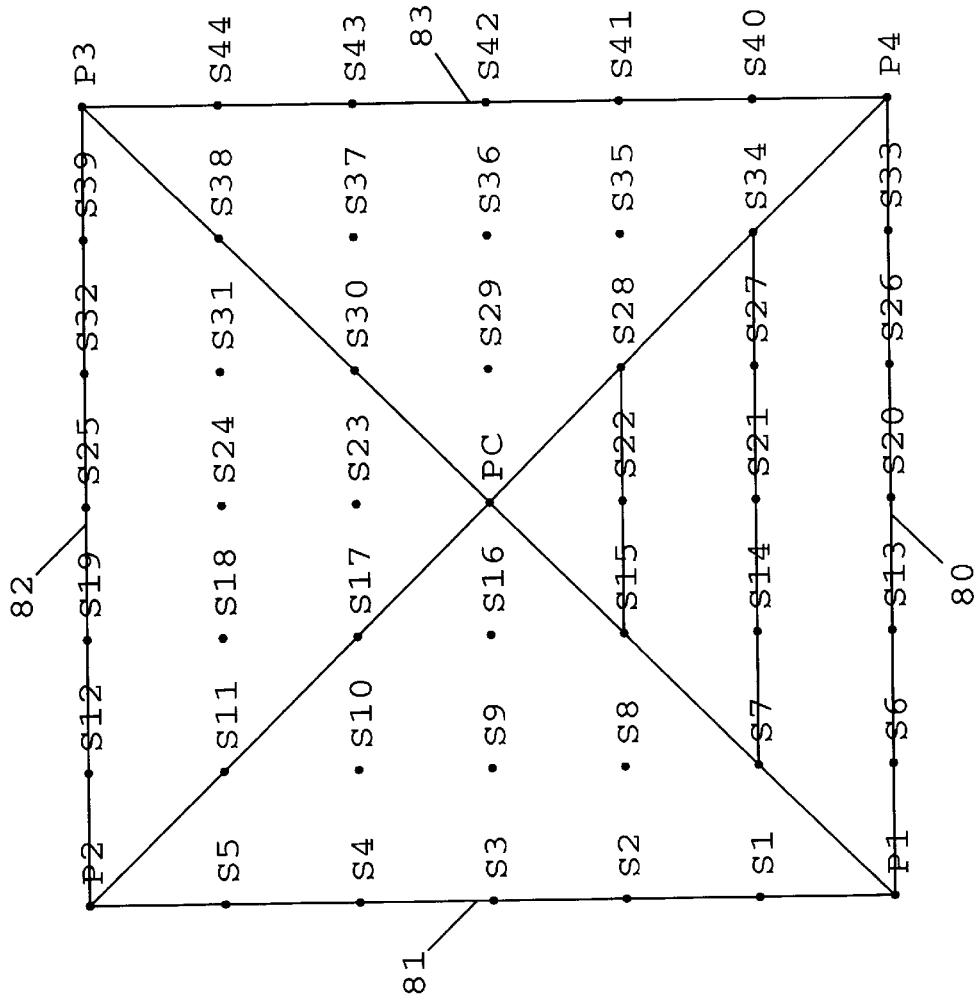
FIG. 9 shows the two interior lines used to interpolate the values of four interior points of the bottom triangle of a 49 point cell.

ZS1=(ZP1+ZP2)/2 similarly:
    ZS2=(ZP1+ZP4)/2
    ZS3=(ZP2+ZP3)/2
    ZS4=(ZP3+ZP4)/2
Since the cell is of size=2, there are no diagonal points or interior triangle points to derive. An example of a cell where one of the real points differs from its corresponding synthesized point is shown in FIG. 2e, where real point R3 is higher than its corresponding synthesized point S3.
   8. If the cell does not meet the flatness criteria make the center elevation point the highest elevation of the 9 corresponding points in the cell from the point(x,y) list, create a cell datablock of type 0, and remove the 9 cell points from the dpoint(x,y) list.
The cell is created even though it does not meet the flatness criteria because it is the smallest cell possible. Marking it as a Type 0 cell tells the computer during runtime that it is a cell with n=1 but any point within the cell may be as high as the cell center elevation point. This makes it possible to warn the pilot to avoid a possible collision.
   9. If the cell does meet the flatness criteria, expand the cell by setting n=2 and repeating the flatness criteria test.
    For n=2, a cell of size=4 is created as shown in FIG. 3a.
Note that there are now 20 points that have been dropped from the elevation database and need to be derived from the center elevation point and four corner elevation points and tested against the flatness criteria.
The derivation of the 20 synthesized points for n=2, cell size=4, is shown in Table 1. Additionally, FIG. 3b shows the edge points, FIG. 4 shows the diagonals, and FIG. 5 shows the interior points for the four triangles. FIG. 4 shows how the diagonals create Bottom Triangle 40, Left Triangle 41, Top Triangle 42, and Right Triangle 43.
   10. If the cell does not meet the flatness criteria for n=2:
    a) Create a cell datablock of type 1 and remove the 9 cell points from the dpoint(x,y) list.
    b) Return to step 3.
   11. If the cell does meet the flatness criteria, expand the cell by setting n=3 and repeating the flatness criteria test.
    For n=3, the cell will be size=6 and will contain 49 points. The center elevation point and the corner elevation points account for 5 points, leaving 44 points that need to be synthesized and tested against the flatness criteria. The method for synthesizing the 44 points is similar to that used in step 9.
The derivation of the 44 synthesized points for n=3, cell size=6 is shown in Table 2. Additionally, FIG. 6 shows the points in the cell, FIG. 7 shows the edge points, FIG. 8 shows the diagonals and FIG. 9 shows the interior points for Bottom Triangle 80. The interior points in Left Triangle 81, Top Triangle 82, and Right Triangle 83 are derived in a similar fashion.
   12. If the cell does not meet the flatness criteria:
    a) Create a cell datablock of type 2 and remove the 25 cell points from the dpoint(x,y) list.

b) Return to step 3.

13. If the cell does meet the flatness criteria, expand the cell by setting n=4 and repeating the flatness criteria test.

For n=4, the cell size will be=8, and the cell will contain 81 points. The center elevation point and the corner elevation points account for 5 points, leaving 76 points that need to be synthesized and tested against the flatness criteria. The method for synthesizing the 76 points is similar to that used in step 11 and is shown in Table 3.

14. This process continues until the cell fails the flatness criteria or a maximum specified cell size is reached. The cell parameters for the last trial cell meeting the flatness criteria or maximum specified cell size are then entered into the polygon database and the points making up the cell are removed from the elevation database. Cells are formed until all the points in the elevation database are used.

Variations

The above described method starts at the top and works toward the bottom and is therefore called the Top-Down method. An alternative is to start at the bottom, with the minimum altitude, and work toward the top. This is called the Bottom-Up method.

The method that has been described, whether Top-Down or Bottom-Up, starts with a square cell having a minimum size and expands the cell until it either fails the flatness criteria or the cell reaches a maximum specified size. This method is called the Min-Max method. An alternative method is to start with a maximum size cell and reduce the cell size until it passes the flatness criteria. This is called the Max-Min method.

Results

Figure 13:
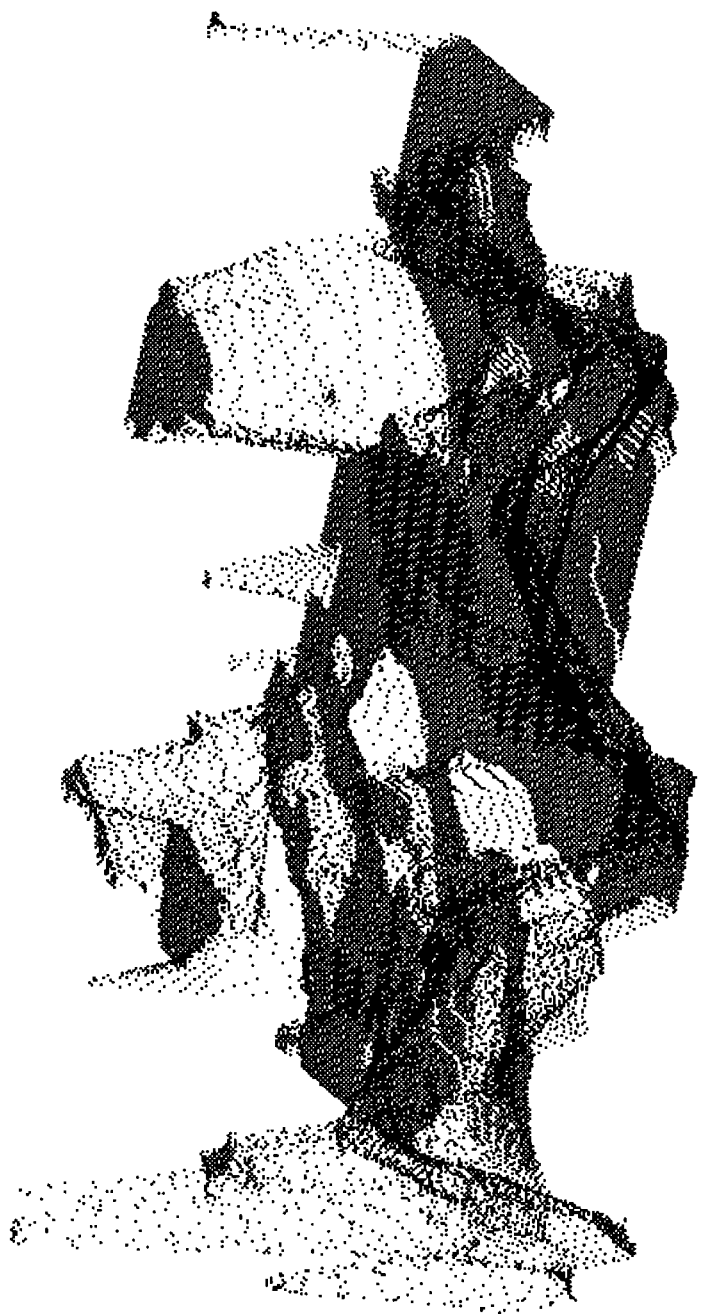
FIG. 13 is a picture of an orthographic projection of a representative base consisting of digital elevation points, with a yaw angle of degrees, without hidden points removed.

FIG. 13 is a picture of an orthographic projection of a representative database consisting of digital elevation points, with a yaw angle of 23.5 degrees. All points are drawn, without hidden points removed.

Figure 14:
FIG. 14 is a picture of an orthographic projection of a polygon database produced from the digital elevation database shown in FIG. 13, using the present method for converting a Digital Elevation Database to a Polygon Database, using the Top-Down Min-Max method.

FIG. 14 is a picture of an orthographic projection of a representative database consisting of polygons produced by the present method of converting a digital elevation database to a polygon database, using the Top-Down Min-Max method. The flatness criteria used were 10 units in the positive direction and 20 units in the negative direction. There were a total of 1963 cells produced. The number of cells of each size are as follows:

Cells of size 2:325

Cells of size 4:120

Cells of size 6:221

Cells of size 8:267

Cells of size 10:1030

Figure 15:
FIG. 15 is a picture of an orthographic projection of a polygon database produced from the digital elevation database shown in FIG. 13, using the present method for converting a Digital Elevation Database to a Polygon Database, using the Bottom-Up Min-Max method.

FIG. 15 is a picture of an orthographic projection of a representative database consisting of polygons produced by the present method of converting a digital elevation database to a polygon database, using the Bottom-Up Min-Max method. The flatness criteria used were 10 units in the positive direction and 20 units in the negative direction. There were a total of 2026 cells produced. The number of cells of each size are as follows:

Cells of size 2:365

Cells of size 4:154

Cells of size 6:228

Cells of size 8:267

Cells of size 10:1012

During the creation of the database, the data are organized in geographic blocks. In operation these geographic blocks are accessed so that the proper data are always present. This is shown in FIG. 10a. FIG. 10b shows that when the user crosses from Block 21 to Block 22, the data from Blocks 10, 20, and 30 are discarded and data from Blocks 13, 23, and 33 are brought in. FIG. 11a and FIG. 11b show the user crossing from Block 22 to Block 32.

Geographic data blocks may use different values for the Flatness Criteria so that areas of special interest, such as around airports, may be represented in greater detail and therefore with less compression.

Different flatness criteria may also be used within the same geographic data block. For example, for areas that are not near airports different flatness criteria may be used for altitudes below 1000 feet above ground level.

Polygon Database

The Polygon Database is composed of blocks of data describing the cells. Each cell requires 8 words of data regardless of the size of the cell. The minimum size cell (n=1) covers 9 elevation points which would require 9 words in an elevation database.

A cell with a size of n=2 covers 25 elevation points which would require 25 words in an elevation database. The cell description still requires only 8 words.

A cell with a size of n=3 covers 49 elevation points which would require 49 words in an elevation database. The cell description still requires only 8 words.

A cell with a size of n=4 covers 81 elevation points which would require 81 words in an elevation database. The cell description still requires only 8 words.

The relationship between the type, n, size, and number of points in the cell is as follows:

n=Type (except for Type=0);

Size=n*2;

Number of points in the cell=(size+1)*(size+1).

The following example is illustrative:

| Type | n | size | cell points |
|------|---|------|-------------|
| 0 | 1 | 2 | 9 |
| 1 | 1 | 2 | 9 |
| 2 | 2 | 4 | 25 |
| 3 | 3 | 6 | 49 |
| 4 | 4 | 8 | 81 |
| 5 | 5 | 10 | 121 |

The following is an example of a C Program definition of a cell data block:

```
struct block
{
   int type;          /* type and size of cell */
   int xcenter;       /* coordinates of center elevation point */
   int ycenter;
   int zcenter;
   int z1,z2,z3,z4;   /* elevations of corner elevation points */
};
```

During program runtime, the 'type' is used to produce 'n' as described above and 'xcenter', 'ycenter', and 'zcenter' are the coordinates of the center elevation point so that:

center elevation point=(xcenter,ycenter,zcenter)

The coordinates of the corner elevation points are derived as follows:

corner elevation point 1=(xcenter−n,ycenter−n,z1);

corner elevation point 2=(xcenter−n,ycenter+n,z2);

corner elevation point 3=(xcenter+n,ycenter+n,z3);

corner elevation point 4=(xcenter+n,ycenter−n,z4);

Because a square cell is used, the x and y coordinates of the corner elevation points are derived from the x and y coordinates of the center elevation point and 'n', making it necessary to store only the elevations of the corner elevation points.

An addditional saving of data storage space can be obtained where the difference in elevation between the center elevation point and the corner elevation points can fit into a byte instead of a word. In this case a C Program definition of a cell data block would be:

```
struct block
{
    int type;           /* type and size of cell */
    int xcenter;        /* coordinates of center elevation point */
    int ycenter;
    int zcenter;
    char                /* delta elevations of corner elevation points */
    dz1,dz2,dz3,dz4;
};
```

Using this method, the 'type' is again used to produce 'n' as described above and 'xcenter', 'ycenter', and 'zcenter' are the coordinates of the center elevation point so that:

center elevation point=(xcenter,ycenter,zcenter).

However, the coordinates of the corner elevation points are now derived as follows:

corner elevation point 1=(xcenter−n,ycenter−n,zcenter+dz1);

corner elevation point 2=(xcenter−n,ycenter+n,zcenter+dz2);

corner elevation point 3=(xcenter+n,ycenter+n,zcenter+dz3);

corner elevation point 4=(xcenter+n,ycenter−n,zcenter+dz4);

Assuming two characters per word, this method requires 6 words to describe a cell instead of 8 words as in the previous method.

Figure 12:
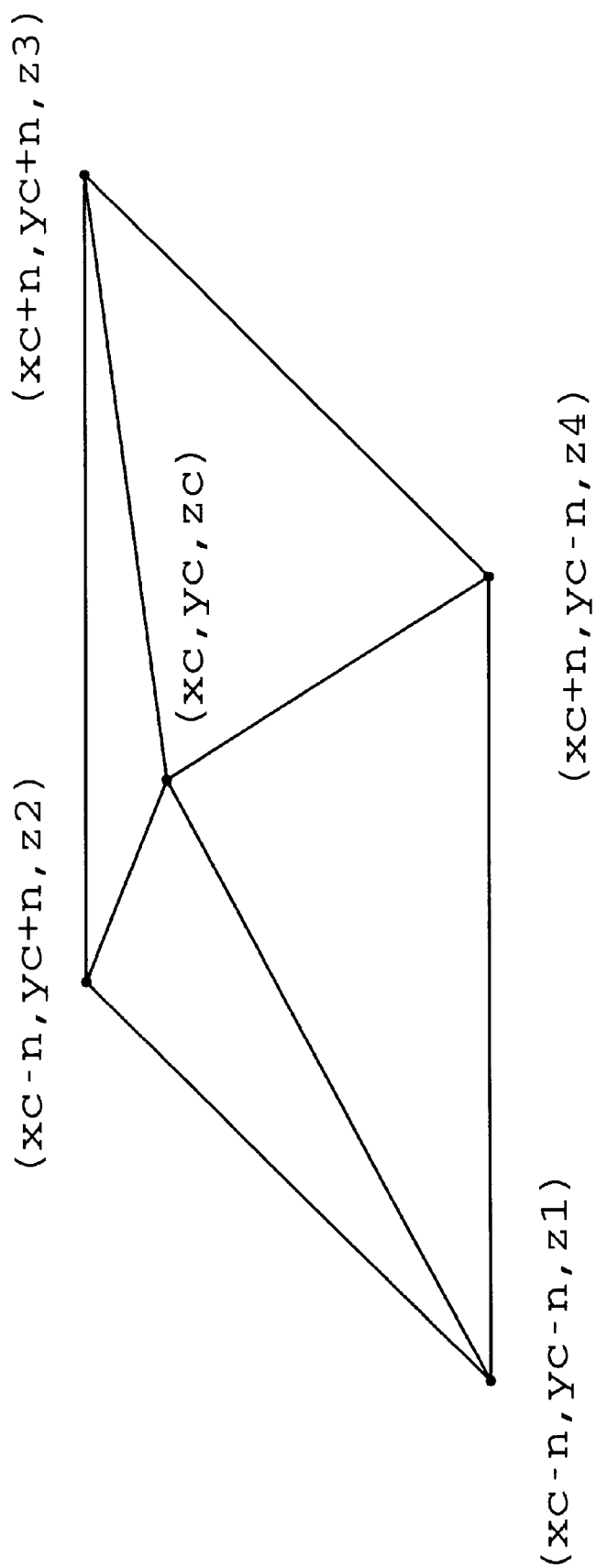
FIG. 12 is a picture of an orthographic projection of a representative created from a cell data block stored in the polygon database.

FIG. 12 is a picture of an orthographic projection of a representative cell created from a cell data block stored in the polygon database.

FIG. 13 is a picture of an orthographic projection of a representative database consisting of digital elevation points. There are 256*256=65,536 elevation points, requiring 65,536 words (131,072 bytes) of storage.

FIG. 14 is a picture of an orthographic projection of a representative database consisting of polygons produced by the present method of converting a digital elevation database to a polygon database, using the Top-Down Min-Max method. There are 1963 cells, requiring 1963*8=15,704 (31,408 bytes) of storage.

Thus, in this example, the polygon database requires only 24% of the storage space required by the digital elevation database.

FIG. 15 is a picture of an orthographic projection of a representative database consisting of polygons produced by the present method of converting a digital elevation database to a polygon database, using the Bottom-Up Min-Max method. There are 2026 cells, requiring 2026*8=16,208 (32,416 bytes) of storage. In this example the Bottom-Up method produces more cells than the Top-Down method. Depending on the original terrain there may be cases where the Bottom-Up method produces fewer cells than the Top-Down method.

3D Math

The math for the present invention has been used in the field of coin-operated video games and in traditional computer graphics and is documented in copending application Ser. No. 08/944,366 filed Oct. 6, 1997, by the present inventor. This copending application also contains a C computer program that demonstrates the basic principles presented therein.

Polygon Edge Enhancement

To prevent a polygon from blending in with its neighbors in a system with a limited number of bits per pixel, polygons can be drawn so that the edges are a different color or shade from the interiors. An example of this is shown in FIG. 14.

Table 1—Synthesized Points for n=2, Cell Size=4

Left Edge:

Point S2 is midway between points P1 and P2 so that ZS2=(ZP1+ZP2)/2.

Point S1 is midway between points P1 and S2 so that ZS1=(ZP1+ZS2)/2.

Point S3 is midway between points S2 and P2 so that ZS3=(ZS2+ZP2)/2.

Top Edge:

Point S12 is midway between points P2 and P3 so that ZS12=(ZP2+ZP3)/2.

Point S8 is midway between points P2 and S12 so that ZS8=(ZP2+ZS12)/2.

Point S17 is midway between points S12 and P3 so that ZS17=(ZS12+ZP3)/2.

Right Edge:

Point S19 is midway between points P4 and P3 so that ZS19=(ZP4+ZP3)/2.

Point S18 is midway between points P4 and S19 so that ZS18=(ZP4+ZS19)/2.

Point S20 is midway between points S19 and P3 so that ZS20=(ZS19+ZP3)/2.

Bottom Edge:

Point S9 is midway between points P1 and P4 so that ZS9=(ZP1+ZP4)/2.

Point S4 is midway between points P1 and S9 so that ZS4=(ZP1+ZS9)/2.

Point S13 is midway between points S9 and P4 so that ZS13=(ZS9+ZP4)/2.

Diagonals:

Point S5 is midway between points P1 and PC so that ZS5=(ZP1+ZPC)/2.

Point S7 is midway between points P2 and PC so that ZS7=(ZP2+ZPC)/2.

Point S16 is midway between points P3 and PC so that ZS16=(ZP3+ZPC)/2.

Point S14 is midway between points P4 and PC so that ZS14=(ZP4+ZPC)/2.

Bottom Triangle:

Point S10 is midway between points S5 and S14 so that ZS10=(ZS5+ZS14)/2.

Left Triangle:

Point S6 is midway between points S5 and S7 so that ZS6=(ZS5+ZS7)/2.

Top Triangle:

Point S11 is midway between points S7 and S16 so that ZS11=(ZS7+ZS16)/2.

Right Triangle:

Point S15 is midway between points S14 and S16 so that ZS15=(ZS14+ZS16)/2.

Table 2—Synthesized Points for n=3, Cell Size=6

Left Edge:

Point S1 is 1/6 between points P1 and P2 so that ZS1=XP1+(ZP2−ZP1)*1/6.

Point S2 is 2/6 between points P1 and P2 so that ZS2=XP1+(ZP2−ZP1)*2/6.

Point S3 is 3/6 between points P1 and P2 so that ZS3=XP1+(ZP2−XP1)*3/6.

Point S4 is 4/6 between points P1 and P2 so that ZS4=XP1+(ZP2−ZP1)*4/6.

Point S5 is 5/6 between points P1 and P2 so that ZS5=XP1+(ZP2−XP1)*5/6.

Top Edge:

Point S12 is 1/6 between points P2 and P3 so that ZS12=ZP2+(ZP3−ZP2)*1/6.

Point S19 is 2/6 between points P2 and P3 so that ZS19=ZP2+(ZP3−ZP2)*2/6.

Point S25 is 3/6 between points P2 and P3 so that ZS25=ZP2+(ZP3−ZP2)*3/6.

Point S32 is 4/6 between points P2 and P3 so that ZS32=ZP2+(ZP3−ZP2)*4/6.

Point S39 is 5/6 between points P2 and P3 so that ZS39=ZP2+(ZP3−ZP2)*5/6.

Right Edge:

Point S40 is 1/6 between points P4 and P3 so that ZS40=ZP4+(ZP3−ZP4)*1/6.

Point S41 is 2/6 between points P4 and P3 so that ZS41=ZP4+(ZP3−ZP4)*2/6.

Point S42 is 3/6 between points P4 and P3 so that ZS42=ZP4+(ZP3−ZP4)*3/6.

Point S43 is 4/6 between points P4 and P3 so that ZS43=ZP4+(ZP3−ZP4)*4/6.

Point S44 is 5/6 between points P4 and P3 so that ZS44=ZP4+(ZP3−ZP4)*5/6.

Bottom Edge:

Point S6 is 1/6 between points P1 and P4 so that ZS6=ZP1+(ZP4−ZP1)*1/6.

Point S13 is 2/6 between points P1 and P4 so that ZS13=ZP1+(ZP4−ZP1)*2/6.

Point S20 is 3/6 between points P1 and P4 so that ZS20=ZP1+(ZP4−ZP1)*3/6.

Point S26 is 4/6 between points P1 and P4 so that ZS26=ZP1+(ZP4−ZP1)*4/6.

Point S33 is 5/6 between points P1 and P4 so that ZS33=ZP1+(ZP4−ZP1)*5/6.

Diagonals:

Point S7 is 1/3 between points P1 and PC so that ZS7=ZP1+(ZPC−ZP1)*1/3.

Point S15 is 2/3 between points P1 and PC so that ZS15=ZP1+(ZPC−ZP1)*2/3.

Point 51 is 1/3 between points P2 and PC so that ZS11=ZP2+(ZPC−ZP2)*1/3.

Point S17 is 2/3 between points P2 and PC so that ZS17=ZP2+(ZPC−ZP2)*2/3.

Point S38 is 1/3 between points P3 and PC so that ZS38=ZP3+(ZPC−ZP3)*2/3.

Point S30 is 2/3 between points P3 and PC so that ZS30=ZP3+(ZPC−ZP3)*2/3.

Point S34 is 1/3 between points P4 and PC so that ZS34=ZP4+(ZPC−ZP4)*2/3.

Point S28 is 2/3 between points P4 and PC so that ZS28=ZP4+(ZPC−ZP4)*2/3.

Bottom Triangle:

Point S21 is midway between points S7 and S34 so that ZS21=(ZS7+ZS34)/2.

Point S14 is midway between points S7 and S21 so that ZS14=(ZS7+ZS21)/2.

Point S27 is midway between points S21 and S34 so that ZS27=(ZS21+ZS34)/2.

Point S22 is midway between points S15 and S28 so that ZS22=(ZS15+ZS28)/2.

Left Triangle:

Point S9 is midway between points S11 and S7 so that ZS9=(ZS11+ZS7)/2.

Point S10 is midway between points S11 and S9 so that ZS10=(ZS11+ZS9)/2.

Point S8 is midway between points S7 and S9 so that ZS8=(ZS7+ZS9)/2.

Point S16 is midway between points S17 and S15 so that ZS16=(ZS17+ZS15)/2.

Top Triangle:

Point S24 is midway between points S11 and S38 so that ZS24=(ZS11+ZS38)/2.

Point S18 is midway between points S11 and S24 so that ZS18=(ZS11+ZS24)/2.

Point S31 is midway between points S24 and S38 so that ZS31=(ZS24+ZS38)/2.

Point S23 is midway between points S17 and S30 so that ZS23=(ZS17+ZS30)/2.

Right Triangle:

Point S36 is midway between points S38 and S34 so that ZS36=(ZS38+ZS34)/2.

Point S37 is midway between points S38 and S36 so that ZS37=(ZS38+ZS36)/2.

Point S35 is midway between points S34 and S36 so that ZS35=(ZS34+ZS36)/2.

Point S29 is midway between points S30 and S28 so that ZS29=(ZS30+ZS28)/2.

Table 3—Synthesized Points for n=4, Cell Size=8

Left Edge:

S1 is 1/8 between points P1 and P2 so that ZS1=ZP1+(ZP2−ZP1)*1/8.

S2 is 2/8 between points P1 and P2 so that ZS2=ZP1+(ZP2−ZP1)*2/8.

S3 is 3/8 between points P1 and P2 so that ZS3=ZP1+(ZP2−XP1)*3/8.

S4 is 4/8 between points P1 and P2 so that ZS4=ZP1+(ZP2−XP1)*4/8.

S5 is 5/8 between points P1 and P2 so that ZS5=ZP1+(ZP2−ZP1)*5/8.

S6 is 5/8 between points P1 and P2 so that ZS6=ZP1+(ZP2−XP1)*6/8.

S7 is 5/8 between points P1 and P2 so that ZS7=ZP1+(ZP2−ZP1)*7/8.

Top Edge:

S16 is 1/8 between points P2 and P3 so that ZS16=ZP2+(ZP3−ZP2)*1/8.

S25 is 2/8 between points P2 and P3 so that ZS25=ZP2+(ZP3−ZP2)*2/8.

S34 is 3/8 between points P2 and P3 so that ZS34=ZP2+(ZP3−ZP2)*3/8.

S42 is 4/8 between points P2 and P3 so that ZS42=ZP2+(ZP3−ZP2)*4/8.

S51 is 5/8 between points P2 and P3 so that ZS51=ZP2+(ZP3−ZP2)*5/8.

S60 is 6/8 between points P2 and P3 so that ZS60=ZP2+(ZP3−ZP2)*6/8.

S69 is 7/8 between points P2 and P3 so that ZS69=ZP2+(ZP3−ZP2)*7/8.

Right Edge:

S70 is 1/8 between points P4 and P3 so that ZS70=ZP4+(ZP3−ZP4)*1/8.

S71 is 2/8 between points P4 and P3 so that ZS71=ZP4+(ZP3−ZP4)*2/8.

S72 is 3/8 between points P4 and P3 so that ZS72=ZP4+(ZP3−ZP4)*3/8.

S73 is 4/8 between points P4 and P3 so that ZS73=ZP4+(ZP3−ZP4)*4/8.

S74 is 5/8 between points P4 and P3 so that ZS74=ZP4+(ZP3−ZP4)*5/8.

S75 is 6/8 between points P4 and P3 so that ZS75=ZP4+(ZP3−ZP4)*6/8.

S76 is 7/8 between points P4 and P3 so that ZS76=ZP4+(ZP3−ZP4)*7/8.

Bottom Edge:

S8 is 1/8 between points P1 and P4 so that ZS8=XP1+(ZP4−ZP1)*1/8.

S17 is 2/8 between points P1 and P4 so that ZS17=ZP1+(ZP4−ZP1)*2/8.

S26 is 3/8 between points P1 and P4 so that ZS26=ZP1+(ZP4−ZP1)*3/8.

S35 is 4/8 between points P1 and P4 so that ZS35=ZP1+(ZP4−ZP1)*4/8.

S43 is 5/8 between points P1 and P4 so that ZS43=ZP1+(ZP4−ZP1)*5/8.

S52 is 6/8 between points P1 and P4 so that ZS52=ZP1+(ZP4−ZP1)*6/8.

S61 is 7/8 between points P1 and P4 so that ZS61=ZP1+(ZP4−ZP1)*7/8.

Diagonals:

S9 is 1/4 between points P1 and PC so that ZS9=ZP1+(ZPC−ZP1)1/4.

S19 is 1/4 between points P1 and PC so that ZS19=ZP1+(ZPC−ZP1)2/4.

S29 is 1/4 between points P1 and PC so that ZS29=ZP1+(ZPC−ZP1)3/4.

S15 is 1/4 between points P2 and PC so that ZS15=ZP2+(ZPC−ZP2)1/4.

S23 is 2/4 between points P2 and PC so that ZS23=ZP2+(ZPC−ZP2)2/4.

S31 is 3/4 between points P2 and PC so that ZS31=ZP2+(ZPC−ZP2)3/4.

S68 is 1/4 between points P3 and PC so that ZS68=ZP3+(ZPC−ZP3)1/4.

S58 is 2/4 between points P3 and PC so that ZS58=ZP3+(ZPC−ZP3)2/4.

S48 is 3/4 between points P3 and PC so that ZS48=ZP3+(ZPC−ZP3)3/4.

S62 is 1/4 between points P4 and PC so that ZS62=ZP4+(ZPC−ZP4)1/4.

S54 is 2/4 between points P4 and PC so that ZS54=ZP4+(ZPC−ZP4)2/4.

S46 is 3/4 between points P4 and PC so that ZS46=ZP4+(ZPC−ZP4)3/4.

Bottom Triangle:

S18 is 1/6 between points S9 and S62 so that ZS18=ZS9+(ZS62−ZS9)*1/6.

S27 is 2/6 between points S9 and S62 so that ZS27=ZS9+(ZS62−ZS9)*2/6.

S36 is 3/6 between points S9 and S62 so that ZS36=ZS9+(ZS62−ZS9)*3/6.

S44 is 4/6 between points S9 and S62 so that ZS44=ZS9+(ZS62−ZS9)*4/6.

S53 is 5/6 between points S9 and S62 so that ZS53=ZS9+(ZS62−ZS9)*5/6.

S28 is 1/4 between points S19 and S54 so that ZS28=ZS19+(ZS54−ZS19)*1/4.

S37 is 2/4 between points S19 and S54 so that ZS37=ZS19+(ZS54−ZS19)*2/4.

S45 is 3/4 between points S19 and S54 so that ZS45=ZS19+(ZS54−ZS19)*3/4.

S38 is 1/2 between points S29 and S46 so that ZS38=(ZS29+ZS46)/2

Left Triangle:

S10 is 1/6 between points S9 and S15 so that ZS10=ZS9+(ZS15−ZS9)*1/6.

S11 is 2/6 between points S9 and S15 so that ZS11=ZS9+(ZS15−ZS9)*2/6.

S12 is 3/6 between points S9 and S15 so that ZS12=ZS9+(ZS15−ZS9)*3/6.

S13 is 4/6 between points S9 and S15 so that ZS13=ZS9+(ZS15−ZS9)*4/6.

S14 is 5/6 between points S9 and S15 so that ZS14=ZS9+(ZS15−ZS9)*5/6.

8 S20 is 1/4 between points S19 and S23 so that ZS20=ZS19+(ZS23−ZS19)1/4.

S21 is 2/4 between points S19 and S23 so that ZS21=ZS19+(ZS23−ZS19)2/4.

S22 is 3/4 between points S19 and S23 so that ZS22=ZS19+(ZS23−ZS19)3/4.

S30 is 1/2 between points S29 and S31 so that ZS30=(ZS29+ZS31)/2

Top Triangle:

S24 is 1/6 between points S15 and S68 so that ZS24=ZS15+(ZS68−ZS15)*1/6.

S33 is 2/6 between points S15 and S68 so that ZS33=ZS15+(ZS68−ZS15)*2/6.

S41 is 3/6 between points S15 and S68 so that ZS41=ZS15+(ZS68−ZS15)*3/6.

S50 is 4/6 between points S15 and S68 so that ZS50=ZS15+(ZS68−ZS15)*4/6.

S59 is 5/6 between points S15 and S68 so that ZS59=ZS15+(ZS68−ZS15)*5/6.

S32 is 1/4 between points S23 and S58 so that ZS32=ZS23+(ZS58−ZS23)*1/4.

S40 is 2/4 between points S23 and S58 so that ZS40=ZS23+(ZS58−ZS23)*2/4.

S49 is 3/4 between points S23 and S58 so that ZS49=ZS23+(ZS58−ZS23)*3/4.

S39 is 1/2 between points S31 and S48 so that ZS39=(ZS31+ZS48)/2

Right Triangle:

S63 is 1/6 between points S62 and S68 so that ZS63=ZS62+(ZS68−ZS62)*1/6.

S64 is 2/6 between points S62 and S68 so that ZS64=ZS62+(ZS68−ZS62)*2/6.

S65 is ³⁄₆ between points S62 and S68 so that ZS65= ZS62+(ZS68−ZS62)*³⁄₆.

S66 is ⁴⁄₆ between points S62 and S68 so that ZS66= ZS62+(ZS68−ZS62)*⁴⁄₆.

S67 is ⁵⁄₆ between points S62 and S68 so that ZS67= ZS62+(ZS68−ZS62)*⁵⁄₆.

S55 is ¼ between points S54 and S58 so that ZS55= ZS54+(ZS58−ZS54)*¼.

S56 is ²⁄₄ between points S54 and S58 so that ZS56= ZS54+(ZS58−ZS54)*²⁄₄.

S57 is ¾ between points S54 and S58 so that ZS57= ZS54+(ZS58−ZS54)*¾.

S47 is ½ between points S46 and S48 so that ZS47= (ZS46+ZS48)/2

While preferred embodiments of the present invention have been shown, it is to be expressly understood that modifications and changes may be made thereto and that the present invention is set forth in the following claims.

I claim:

1. A method for converting a digital elevation database to a polygon database comprising the computer generated steps of:
   a) providing a selected active elevation point in said digital elevation database, whereby said digital elevation database comprises a plurality of elevation points, each elevation point representing an elevation of a point on a terrain;
   b) defining a square cell defined by a center elevation point and four corner elevation points, whereby said selected active elevation point is selected as said center elevation point, and said four corner elevation points are selected to produce a square cell having a minimum size;
   c) using said center elevation point and said four corner elevation points to produce four three dimensional triangles whereby each three dimensional triangle is formed from said center elevation point and two adjacent said corner elevation points forming a side of said square cell;
   d) determining if said four three dimensional triangles meet a flatness criteria; whereas said flatness criteria is defined such that no point in said four three dimensional triangles may be greater than a first distance above the corresponding point in said digital elevation database and no point in said four three dimensional triangles may be greater than a second distance below the corresponding point in said digital elevation database;
   e) if said four three dimensional triangles meet said flatness criteria and said square cell has not exceeded a maximum specified size, performing the steps of:
      (i) expanding the size of said square cell, thereby selecting new said four corner elevation points, while retaining said center elevation point;
      (ii) repeating step c) through step e);
   otherwise, performing the steps of:
      (i) storing said square cell in said polygon database;
      (ii) marking as inactive the points in said digital elevation database corresponding to the area covered by said square cell.

2. The method of claim 1 wherein the highest active point in said digital elevation database is selected as said selected active elevation point.

3. The method of claim 1 wherein the lowest active point in said digital elevation database is selected as said selected active elevation point.

4. The method of claim 1 wherein step a) through step e) are repeated until each elevation point in said digital elevation database is processed.

5. The method of claim 1 wherein said square cell having a minimum size that fails said flatness criteria is tagged as having failed said flatness criteria before being stored in said polygon database.

6. The method of claim 5 wherein said center elevation point of said square cell having a minimum size that fails said flatness criteria is selected to be the highest elevation of the points in said digital elevation database corresponding to the area covered by said square cell having a minimum size.

7. The method of claim 1 wherein the elevation points in said four three dimensional triangles are calculated by performing the steps of:
   a) reading the elevations of said center elevation point and said four corner elevation points;
   b) calculating the elevations of the remaining points in said square cell by performing the steps of:
      (i) using said four corner elevation points to interpolate the elevations of the remaining points on the left edge, right edge, top edge, and bottom edge of said square cell;
      (ii) using said center elevation point and said four corner elevation points to interpolate the elevations of the remaining points on the four diagonal lines formed from said center elevation point to each of said four corner elevation points of said square cell;
      (iii) using the elevations of said four diagonal lines to interpolate the elevations of the remaining points in each one of said four three dimensional triangles.

8. The method of claim 1 wherein said flatness criteria may be different for different altitudes above ground level.

9. The method of claim 1 wherein said polygon database comprises a plurality of geographic blocks, each geographic block representing a geographic area, wherein a first geographic block may have a first said flatness criteria and a second geographic block may have a second said flatness criteria.

10. A method for converting a digital elevation database to a polygon database comprising the computer generated steps of:
   a) providing a selected active elevation point in said digital elevation database, whereby said digital elevation database comprises a plurality of elevation points, each elevation point representing an elevation of a point on a terrain;
   b) defining a square cell defined by a center elevation point and four corner elevation points, whereby said selected active elevation point is selected as said center elevation point, and said four corner elevation points are selected to produce a square cell having a predetermined maximum size;
   c) using said center elevation point and said four corner elevation points to produce four three dimensional triangles whereby each three dimensional triangle is formed from said center elevation point and two adjacent said corner elevation points forming a side of said square cell;
   d) determining if said four three dimensional triangles meet a flatness criteria; whereas said flatness criteria is defined such that no point in said four three dimensional triangles may be greater than a first distance above the corresponding point in said digital elevation database and no point in said four three dimensional triangles may be greater than a second distance below the corresponding point in said digital elevation database;

e) if said four three dimensional triangles fail to meet said flatness criteria, performing the steps of:
  (i) reducing the size of said square cell, thereby selecting new said four corner elevation points, while retaining said center elevation point;
  (ii) repeating step c) through step e);
otherwise, performing the steps of:
  (i) storing said square cell in said polygon database;
  (ii) marking as inactive the points in said digital elevation database corresponding to the area covered by said square cell.

11. The method of claim 10 wherein the highest active point in said digital elevation database is selected as said selected active elevation point.

12. The method of claim 10 wherein the lowest active point in said digital elevation database is selected as said selected active elevation point.

13. The method of claim 10 wherein step a) through step e) are repeated until each elevation point in said digital elevation database is processed.

14. The method of claim 10 wherein a square cell having a minimum size that fails said flatness criteria is tagged as having failed said flatness criteria before being stored in said polygon database.

15. The method of claim 14 wherein said center elevation point of said square cell having a minimum size that fails said flatness criteria is selected to be the highest elevation of the points in said digital elevation database corresponding to the area covered by said square cell having a minimum size.

16. The method of claim 10 wherein the elevation points in said four three dimensional triangles are calculated by performing the steps of:
  a) reading the elevations of said center elevation point and said four corner elevation points;
  b) calculating the elevations of the remaining points in said square cell by performing the steps of:
    (i) using said four corner elevation points to interpolate the elevations of the remaining points on the left edge, right edge, top edge, and bottom edge of said square cell;
    (ii) using said center elevation point and said four corner elevation points to interpolate the elevations of the remaining points on the four diagonal lines formed from said center elevation point to each of said four corner elevation points of said square cell;
    (iii) using the elevations of said four diagonal lines to interpolate the elevations of the remaining points in each one of said four three dimensional triangles.

17. The method of claim 10 wherein said flatness criteria may be different for different altitudes above ground level.

18. The method of claim 10 wherein said polygon database comprises a plurality of geographic blocks, each geographic block representing a geographic area, wherein a first geographic block may have a first said flatness criteria and a second geographic block may have a second said flatness criteria.

19. A method for interpolating the edge points and interior points of a square cell defined by a center elevation point and four corner elevation points, whereby said center elevation point and said four corner elevation points form four three dimensional triangles, whereby each three dimensional triangle is formed from said center elevation point and two adjacent said corner elevation points forming a side of said square cell, comprising the computer generated steps of:
  a) using said four corner elevation points to interpolate the elevations of the remaining points on the left edge, right edge, top edge, and bottom edge of said square cell;
  b) using said center elevation point and said four corner elevation points to interpolate the elevations of the remaining points on the four diagonal lines formed from said center elevation point to each one of said four corner elevation points of said square cell;
  c) using the elevations of said four diagonal lines to interpolate the elevations of the remaining points in each one of said four three dimensional triangles.

* * * * *